United States Patent [19]

Chung

[11] Patent Number: 4,937,307

[45] Date of Patent: Jun. 26, 1990

[54] UNIQUE LOW VISCOSITY POLYESTERS AND THEIR PRODUCTS

[75] Inventor: Daniel A. Chung, Dublin, Ohio

[73] Assignee: The Goodyear Tire & Rubber Company, Akron, Ohio

[21] Appl. No.: 344,624

[22] Filed: Apr. 28, 1989

[51] Int. Cl.$^5$ .............................................. C08G 18/32
[52] U.S. Cl. ....................................... 528/76; 528/83; 560/76; 560/91
[58] Field of Search ...................... 528/76, 83; 560/76, 560/91

[56] References Cited

U.S. PATENT DOCUMENTS 4,284,750  8/1981  Amirsakis ............................. 528/83

Primary Examiner—Maurice J. Welsh
Attorney, Agent, or Firm—J. D. Wolfe; Alvin T. Rockhill

[57] ABSTRACT

These low viscosity polyesters and their products, such as urethanes produced with organic polyisocyanate(s) alone or plus a reactive diluent, such as a glycol or polyester glycols are uniquely useful for coatings, liquid coatings and as an adhesive for films and rubbers. These copolyesters are highly viscous at 24.4° C. but at 40° to 60° C. they are thin enough to be intimately mixed with reactants such as an organic polyisocyanate or epoxy resin and diluents without need to use solvents which pollute the atmosphere.

12 Claims, 4 Drawing Sheets

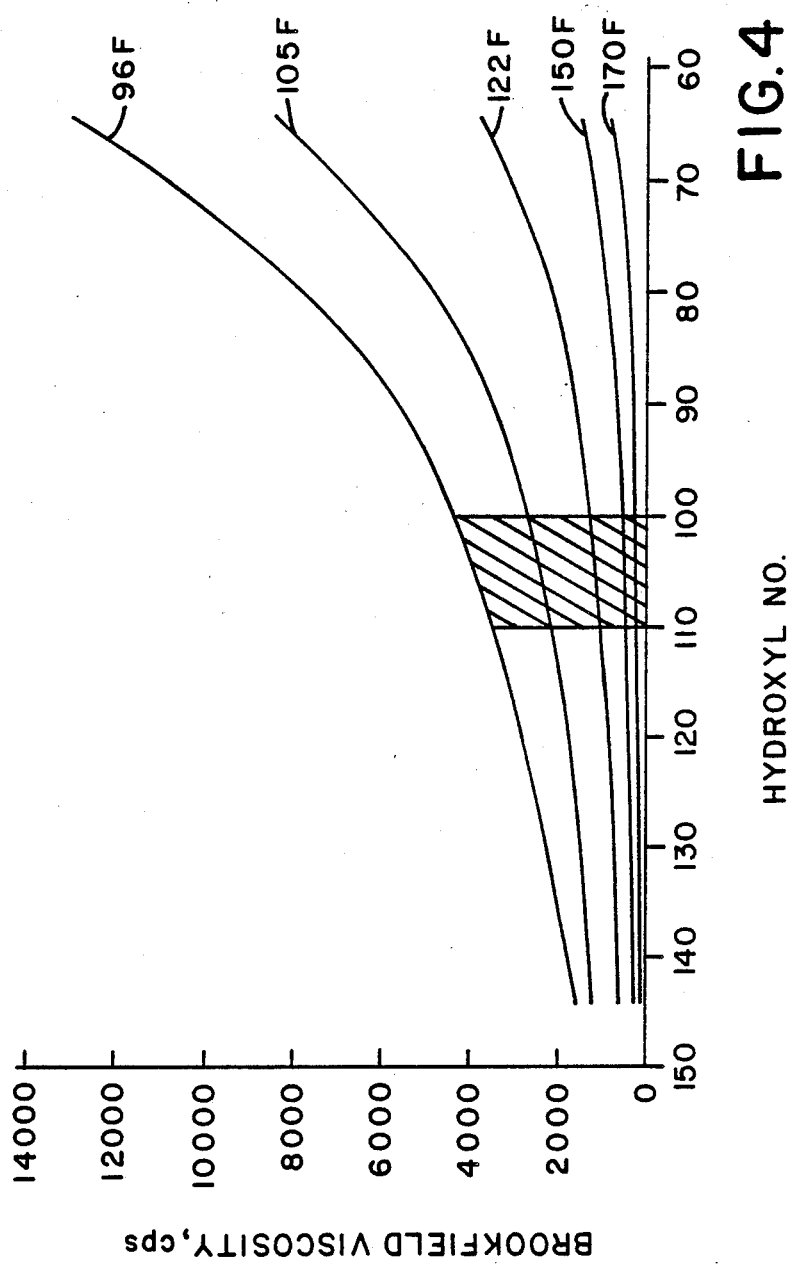

UNIQUE LOW VISCOSITY POLYESTERS AND THEIR PRODUCTS

TECHNICAL FIELD

This invention relates to liquid copolyesters that are highly viscous at 24.4° C. but thin out sufficiently at 40.5° C. to be applicably without use of solvents and has high reactivity with reactive chemical agents to yield coatings, adhesive or a broad class of films as well as other products. These products are unique, too, in that they can be made without solvents which have to be removed at least in the use or the cure phase.

1. Prior Art

Polyesters have been made from a low molecular weight of a few hundred to greatly in excess of 10,000, the superpolymer range. These polyesters have been used for many purposes such as making fabric, extruded or coated to form a film, making polyurethane, powder coatings or paints. The use, such as paints, etc., requires the polyester to be put in solution in strong solvents to be applied or used. These solvents are ecologically detrimental. Thus, the need has existed for ways to apply the polyester without use of a solvent or to melt them as in powder coatings. Hence, it is desirable that the polyester be a really thin liquid, but the conventional copolyesters are semisolid to very viscous materials.

2. The Invention

I have discovered that certain copolyesters can be made which are very viscous at 24.4° C., and essentially impossible to apply without solvents, but becomes relatively thin at 40.5° C. and can be used and applied without the need for solvents.

Generally, it has been thought that the viscosity of polyesters varied essentially directly with the molecular weight, viz. the hydroxyl number. I have discovered that the copolyesters of certain combination of glycols and polyacids exhibit unique properties in regard to viscosity and molecular weight and, thus, can be used without solvents to make cements, films or coatings on various substrates.

Not only can these very viscous copolyesters be used for the above purposes, but their mixtures with certain chemical reaction agents such as organic polyisocyanates exhibit highly desirable properties and are relatively highly hydrolysis resistant comparable to other polyesterurethanes. These copolyesters have a molecular weight range that allows the films, coatings and adhesives to be prepared with a broad range of modulus, ultimate tensile, elongation and adhesive values needed to satisfy the needs required of these products.

Unexpectedly, it was discovered that these copolyesters could be reacted with organic isocyanates to make an excellent adhesive to adhere precured rubber to precured rubber, something that heretofore was considered to require a tiegum to achieve a satisfactory bond.

Generally liquid polyesters were prepared by first charging the acid(s) and glycol(s) into a flask. The monomers were heated to 200°-250° C. and allowed to react until at least 95% of the theoretical amount of water distilled over. Vacuum was then used to remove the excess glycol, while the temperature was kept at the same range of 200°-250° C. Vacuum was broken when the desired hydroxyl number of 100-120 was reached.

The liquid polyester resins were cured to show that films of different modulus values were obtainable dependent on the selection and amount of reactive diluent and isocyanate in the cure formulations. As an example tetramethylene glycol (TMG) was used as a reactive diluent. In addition to difunctional reactive diluent, a small amount of trifunctional or tetrafunctional glycol may be used to introduce some network structure to the cured liquid polyester. Usually about 1 to about 30is used but actually mold percent of reactive diluent is a function of the diluent and the property desired.

The organic polyisocyanate used was based on 4,4'-diphenylmethane diisocyanate which was modified so that it remains fluid at ambient temperatures and has a functionality of approximately 2.2. Mobay Chemical Corporation offers two such modified polyisocyanates under the trade names MONDUR PF and MONDUR CD. Aliphatic diisocyanates may be used as well as aromatic diisocyanates. As examples, Mobay's Desmodur W was used to cure the liquid polyesters of this invention and were reacted at Desmodur W levels of 0.95 to 1.10.

In the cure process, the polyester resin and TMG react with the polyisocyanate in a condensation reaction. The initial reaction is chain extension which builds up the molecular weight. Excess isocyanate was used in curing. The purpose was to introduce crosslinking between polymer chains which occurs because the isocyanate can abstract a proton from any of the newly formed urethane linkages to form allophanate crosslinks. The curing reactions were carried out either by heating or, if heating was not preferred, by using a conventional urethane tin catalyst, such as dibutyl tin dilaurate, stannous octoate, etc. or tertiary amines, such as triethylamine, morpholine, etc.

In addition to being a reactive triol diluent, trimethylolpropane may be charged with hexamethylene glycol in the beginning of the liquid polyester (LPE) synthesis and to change the stress-strain of the films after curing the branched liquid polyester (LPE) with an aliphatic diisocyanate, MONDUR CD. The branched LPE gives films with higher modulus and lower ultimate elongation.

Any fluid glycol may be used as a reactive diluent and at higher isocyanate levels with ethylene glycol formulations produce higher tensile strength than the TMG formulations.

When diethylene glycol (DEG) was used in place of hexamethylene glycol (Hm) in the LPE formulation, a lower viscosity resin was obtained and the DEG resin cured to give a film with lower modulus, lower ultimate tensile strength, but higher ultimate elongation. However, the tensile and modulus property decreased gradually as hexamethylene glycol was systematically replaced by DEG in a series of LPE's.

Peel adhesion samples were also prepared from the polyester resins. The construction was Du Pont's 5-mil thick Mylar film (a polyester film) to itself. The Mylar film was biaxially oriented, but was not coated with any adhesion promoter. The peel samples were passed through a laminator four times to build a film or coating on the Mylar film. The temperature of the laminator was set at 200° C. Excellent adhesion was observed in each case.

Excellent lap shear adhesion was observed when LPE's were cured between fiberglass reinforced plastic (FRP) panels. The cured LPE retained adhesion after heat aging for two hours at 400° F. or 425° F.

In addition to excellent adhesion, the cured LPE's in this invention also showed excellent abrasion resistance for coating applications. The Taber abrasion resistance of LPE's compared to the commercial Hytrel polyester elastomer was favorable.

The polyesters are characterized by a hydroxyl number of about 95 to 115, a molecular weight of about 950 to 1900 and a viscosity of about 2,000 to 20,000 CPS at 24.4° C. and a viscosity of about 550 to 3,000 CPS at 40.5° C. comprised of a copolyester of hexamethylene glycol with isophthalic acid and azelaic acid; a copolyester of diethylene glycol with isophthalic acid, terephthalic acid and azelaic acid; a copolyester of diethylene glycol with isophthalic and azelaic acid; and a copolyester of a mixture of polytetramethylene glycol of 500 to 1,000 molecular weight and tetramethylene glycol with isophthalic acid and azelaic acid with the proviso the acid may be an anhydride.

The nature of this invention will be more readily understood by reference to the following representative and illustrative examples where all percentages are mole percent unless otherwise stated.

In a preliminary scale-up program, Bench Scale ran three of the formulations proposed. The viscosity probe was used to monitor the progress of the polymerization.

The Brookfield viscosity value is considered a simple measurement to perform on a liquid sample. It may be adopted as a method to follow the progress of the reaction. A batch was discharged when a certain viscosity value was achieved.

Five samples were obtained from each of the three formulations Bench Scale ran as shown in the figures. Two batches of the DEG-I/Az formulation were prepared. The DEG-I/T/Az formulation was not attempted by Bench Scale, although successfully run were made on the laboratory scale.

The Brookfield viscosity values at five temperatures (96, 105, 122, 150 and 170° F.) were obtained for each of the 20 samples. A hydroxyl number of 105±5 was found to be desirable as a target value for future batches useful in this invention as shown by the figures and tables. This hydroxyl number corresponds to a molecular weight before the viscosities rise more rapidly.

BRIEF DESCRIPTION OF DRAWINGS

The viscosity ranges proposed as targets to yield the desired discovered hydroxyl numbers are shown as shaded areas in the FIGS. 1 to 4.

Two batches based on DEG-I/Az (11/50/45 and 22/50/44) had unusually high acid numbers, a sample prepared in the laboratory gave an acid number of 8.5. High acid content in a cured polyester might suffer in properties such as hydrolysis resistance. It might also be an indication of incomplete acid-glycol reaction. In fact, batch 22/50/44 turned cloudy on storage, due to the crystallization of unreacted acids. Further reaction and removal of acid-glycol eliminated these defects due to high acid number. Thus, the preferred liquid copolyester of this invention has acid numbers less than 10 and, more preferably, less than than 5 to essentially less than 1 to 0 5.

Figure 1:
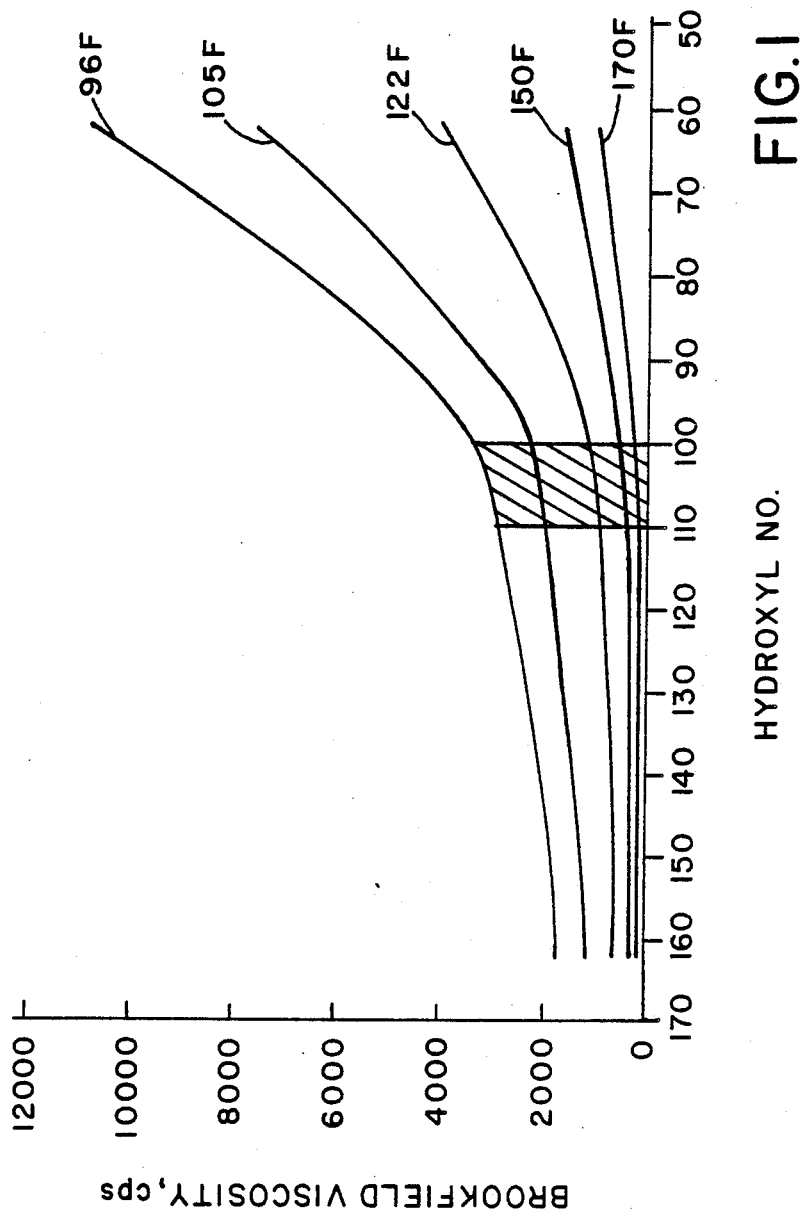
Figure 2:
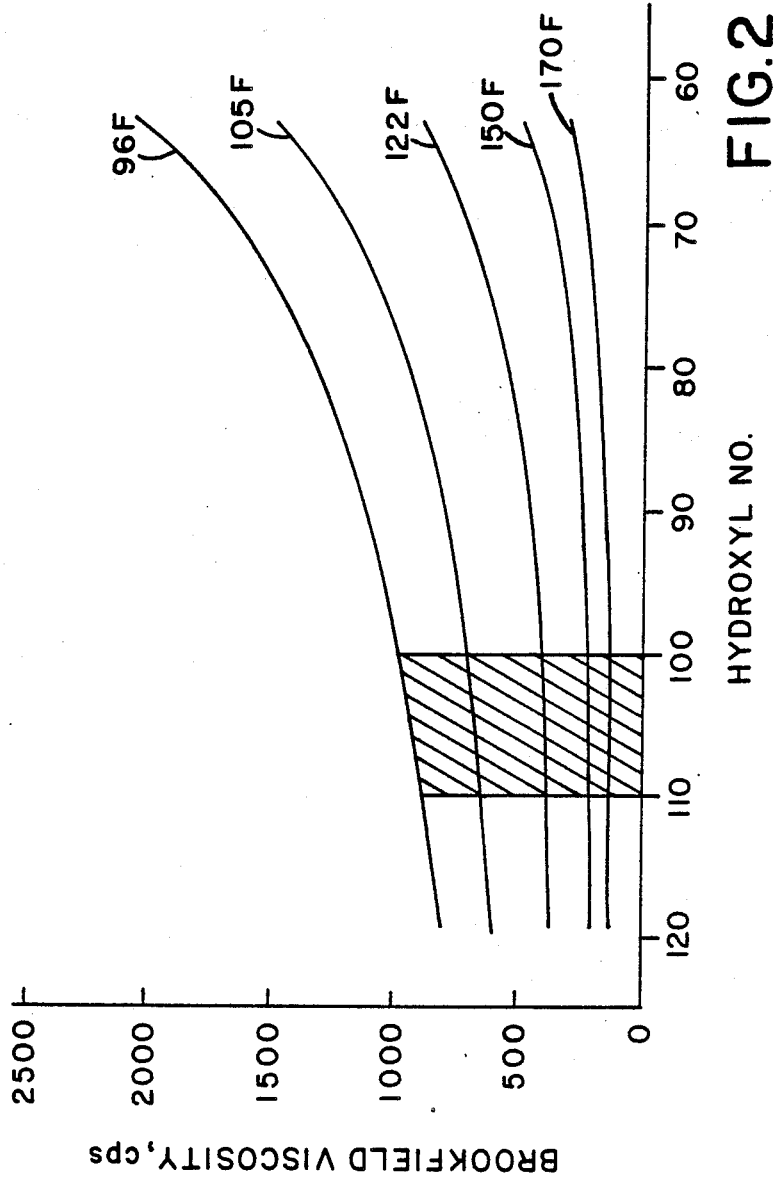
Figure 3:
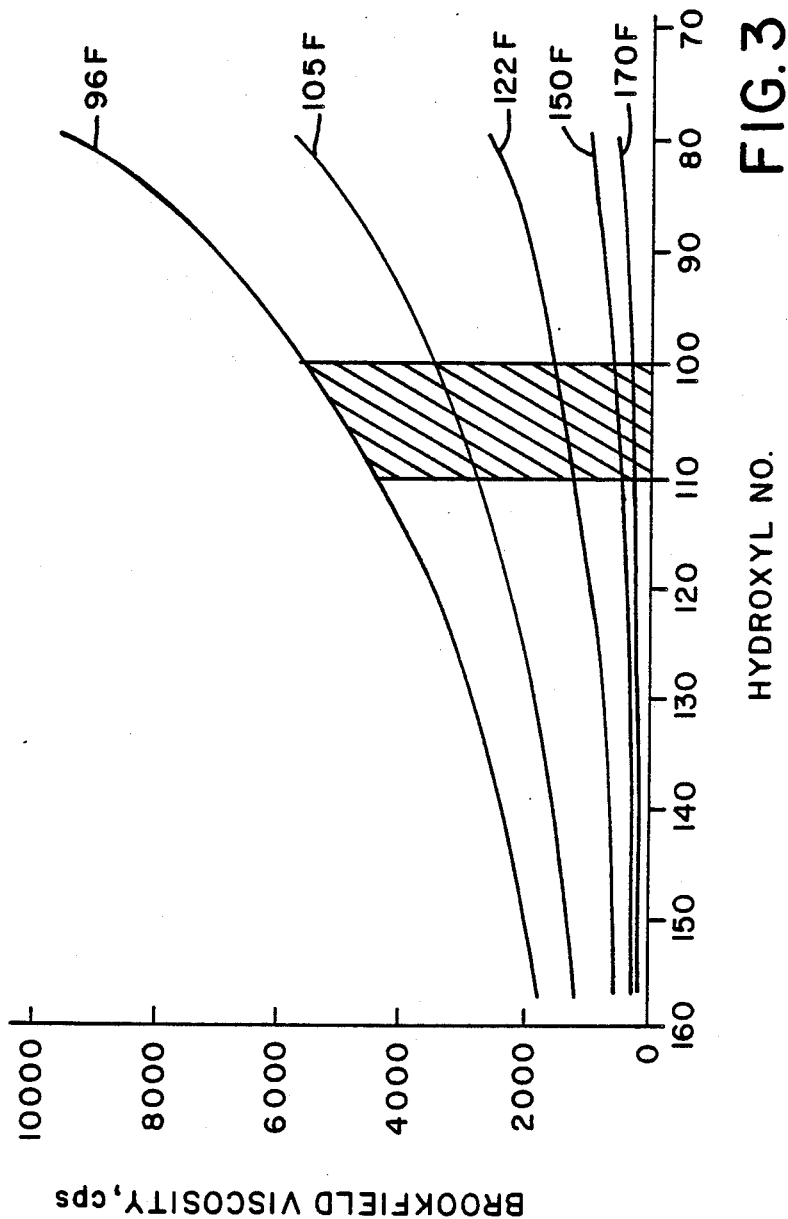

A comparison of FIGS. 3 and 4 showed the reproducibility of the viscosity property of the DEG-I/Az formulation. For example, at a hydroxyl number of 110 batch 22/50/44 had a viscosity of 2200 cps at 105° F., very comparable to the value of 2800 cps observed for batch 11/50/45. These runs in Bench Scale showed the dependability of the Brookfield viscosity as a guide to discharge of a batch at a desired hydroxyl number.

Tables 2 to 7 show physical properties of the polyurethane produced by these polyesters. In these figures and tables the LPE plus a number viz LPE-I designates a polyester of the composition shown in Table I. Hm-I/Az designates a LPE of hexamethylene glycol with an isophthalic acid (50%) and azelaic acid (50%). Likewise, DEG-I/Az designates an LPE-II copolyester is one of diethyleneglycol with isophthalic acid, and azelaic acid in the respective percentages shown therefore. LPE-III designates a polyester of a terpolyester where T designates a terephthalic acid. LPE-IV is a liquid polyester of a 75% Teracol 650, a polytetramethylenetherglycol and 50% isophthalic acid and 50% azelaic acid. The ratio TmG/LPE indicates the amount of non-polyester glycol used as a diluent with the LPE. Similarly the mondur CD to LPE plus Diol designates the amount of Diol curative used to make the polyester urethane with the indicated organic polyisocyanate.

TABLE 1

PHYSICAL PROPERTIES OF LIQUID POLYESTERS

| LPE | COMPOSITION | HYDROXYL NO | ACID NO | BROOKFIELD VISCOSITY, CPS | |
|-----|-------------|-------------|---------|---------|---------|
| | | | | 80° F. | 105° F. |
| I | HM-I/AZ @ 50/50 | 108 | 10 | 8,700 | 2,650 |
| II | DEG-I/AZ @ 50/50 | 110 | 13 | 7,500 | 2,150 |
| III | DEG-I/T/AZ @ 30/20/50 | 100 | 12 | 12,200 | 3,150 |
| IV | TERACOL 650/TMG -I/AZ @ 75/25–50/50 | 120 | 11 | 1,600 | 590 |

TABLE 2

EFFECT OF HYDROXYL NUMBER ON CURED LPE-I

| HYDROXYL NO | MW | MODULUS 100% | T/E |
|---|---|---|---|
| 97 | 1150 | 2000 | 6500/250 |
| 108 | 1040 | 2300 | 7200/260 |
| 125 | 898 | 3300 | 8200/260 |
| 168 | 668 | | 1800/6 |

$$\frac{TMG}{LPE} = 0.7 \qquad \frac{MONDUR\ CD}{LPE + DIOL} = 1.24$$

TABLE 3

EFFECT OF ISOCYANATE LEVEL ON CURED LPE-I

| MONDUR PF LEVEL | MODULUS 100% | 300 | T/E |
|---|---|---|---|
| 1.00 | 360 | 860 | 2300/490 |
| 1.15 | 660 | 3300 | 5500/370 |
| 1.24 | 600 | 3000 | 3500/330 |

$$\frac{TMG}{LPE} = 0.65$$

TABLE 4

EFFECT OF DIOL DILUENT OF CURED LPE-I

| TMG LEVEL | MODULUS 100% | 300% | T/E |
|---|---|---|---|
| 0.25 | 230 | 430 | 3400/460 |
| 0.40 | 380 | 2100 | 3800/380 |
| 0.65 | 600 | 3000 | 3500/330 |
| 0.85 | 1600 | 5400 | 6700/330 |

TABLE 4-continued
EFFECT OF DIOL DILUENT OF CURED LPE-I

| TMG LEVEL | MODULUS 100% | 300% | T/E |
|---|---|---|---|

$$\frac{MONDUR\ PF}{LPE + DIOL} = 1.24$$

TABLE 5
EFFECT OF DIOL DILUENT LEVEL ON CURED LPE-IV

| TMG LEVEL | MODULUS 100% | 300% | T/E |
|---|---|---|---|
| 0.30 | 530 | 770 | 1900/650 |
| 0.50 | 740 | 1200 | 2100/520 |
| 0.70 | 1100 | 1700 | 2600/470 |
| 0.90 | 1500 | 2500 | 3500/440 |

$$\frac{MONDUR\ PF}{LPE + DIOL} = 1.20$$

TABLE 6
EFFECT OF DEG/HMG RATIO ON UNCURED AND CURED LPE

| LPE | DEG/HMG | HYDROXYL NO | ACID NO | 74° VISCOSITY CPS | 100% MODULUS | T/E |
|---|---|---|---|---|---|---|
| II | 100/0 | 111 | 8 | 5,800 | 1000 | 3100/300 |
|  | 60/40 | 102 | 19 | 9,800 | 850 | 2200/250 |
|  | 40/60 | 95 | 11 | 10,000 | 950 | 3300/260 |
|  | 20/80 | 117 | 13 | 9,000 | 1100 | 4100/260 |
| I | 0/100 | 103 | 12 | 8,000 | 1300 | 4000/240 |

$$\frac{TMG}{LPE} = 0.70 \qquad \frac{MONDUR\ CD}{LPE + TMG} = 1.24$$

TABLE 7
ADHESION OF CURED LPE'S TO UNTREATED BIOXIALLY ORIENTATED POLYESTER FILM

| COMPOSITION | PEEL ADHESION, *PLI |
|---|---|
| HM-I/AZ-TMG-MONDUR CD | 2.8 |
| HM-I/AZ-TMG-MONDUR PF | 3.0 |
| HM-I/AZ-TMG/TMP-MONDUR PF | 1.5 |
| HM/I/AZ-TMG/QUAD-MONDUR PF | 1.7 |
| DEG-I/T/AZ-TMG/QUAD/DESMODUR W | 3.0 |
| DEG/I/T/AZ-EG/QUAD-DESMODUR W | 1.2 |
| TERACOL 650/TMG-I/AZ-TMG-MONDUR PF | 2.0 |

*FILM TEAR OBSERVED IN ALL SAMPLES

What is claimed is:

1. Polyesters characterized by a hydroxyl number of about 95 to 115, a molecular weight of about 950 to 1900 and a viscosity of about 2,000 to 20,000 CPS at 24.4° C. and a viscosity of about 550 to 3,000 CPS at 40.5° C. comprised of a copolyester of hexamethylene glycol with isophthalic acid and azelaic acid or a copolyester of diethylene glycol with isophthalic acid, terephthalic acid and azelaic acid or a copolyester of diethylene glycol with isophthalic and azelaic acid or a copolyester of a mixture of polytetramethylene glycol of 500 to 1,000 molecular weight and tetramethylene glycol with isophthalic acid and azelaic acid with the proviso the acid may be an anhydride.

2. The reaction product of the polyester of claim 1 with an organic polyisocyanate.

3. The reaction product of claim 2 wherein the organic polyisocyanate is a fluid at about 50° C.

4. The reaction product of the polyester of claim 3 wherein the organic polyisocyanate is an aliphatic or cycloaliphatic polyisocyanate.

5. The reaction product of the polyesters of claim 3 wherein the polyisocyanate is a modified 4,4'-diphenyl diisocyanate.

6. The polyester of claim 1 wherein the copolyester is hexamethylene glycol with 40 to 60% of isophthalic acid or anhydride and 60 to 40% of azelaic acid or anhydride.

7. The polyester of claim 1 wherein the copolyester is diethylene glycol with 40 to 60% isophthalic acid or anhydride and 60 to 40% azelaic acid or anhydride.

8. The polyester of claim 1 wherein the polyester is diethylene glycol with isophthalic, terephthalic and azelaic acids.

9. Polyesters characterized by a hydroxyl number of about 105 ±5, a molecular weight of about 1,000 to 1,500 and a viscosity of 2,000 to 20,000 cps at 24.4° C. and a viscosity of 550 to 3,000 cps at 40.5° C. comprised of a copolyester hexamethylene glycol with 40 to 60% of isophthalic acid and 60 to 40% azelaic acid; diethylene glycol with 40 to 60% isophthalic acid and 60 to 40% azelaic acid: diethylene glycol with 25 to 35% isophthalic acid, 25 to 15% of terephthalic acid and 50 ±5% azelaic acid: and a mixture of 70 to 80% of polytetramethylene glycol of 500 to 1,000 molecular weight and 30 to 20% of tetramethylene glycol with 45 to 55% isophthalic acid and 55 to 45 of azelaic acid.

10. The reaction product of the polyester of claim 9 with an organic polyisocyanate.

11. The reaction product of the polyester of claim 10 wherein the organic polyisocyanate is a fluid at about 50° C.

12. The reaction product of the polyester of claim 11 wherein the organic polyisocyanate is selected from the class consisting of the modified aromatic diisocyanate, the aliphatic diisocyanate and cycloaliphatic diisocyanate.

* * * * *